US011255302B1

(12) United States Patent
Yang et al.

(10) Patent No.: US 11,255,302 B1
(45) Date of Patent: Feb. 22, 2022

(54) INTAKE SYSTEM FOR VEHICLE

(71) Applicants: Hyundai Motor Company, Seoul (KR); Kia Corporation, Seoul (KR)

(72) Inventors: Il Suk Yang, Hwaseong-si (KR); Won Gyu Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/459,280

(22) Filed: Aug. 27, 2021

(30) Foreign Application Priority Data

Nov. 23, 2020 (KR) .......................... 10-2020-0158004

(51) Int. Cl.
*F02M 35/10* (2006.01)
*F02D 41/00* (2006.01)

(52) U.S. Cl.
CPC ... *F02M 35/10163* (2013.01); *F02D 41/0007* (2013.01); *F02M 35/10222* (2013.01)

(58) Field of Classification Search
CPC ........ F02M 35/10209; F02M 35/10163; F02B 37/16
See application file for complete search history.

(56) References Cited

U.S. PATENT DOCUMENTS

| 5,653,202 | A | * | 8/1997 | Ma | F02M 26/44 123/184.43 |
| 2005/0155570 | A1 | * | 7/2005 | Confer | F02D 9/103 123/306 |
| 2015/0027114 | A1 | * | 1/2015 | Ino | F02B 29/0475 60/599 |
| 2015/0330340 | A1 | * | 11/2015 | Oiwa | F02M 35/1015 123/184.38 |
| 2018/0283329 | A1 | * | 10/2018 | Kato | F02M 35/10124 |

FOREIGN PATENT DOCUMENTS

| KR | 20090063909 A | * | 6/2009 |
| KR | 10-1296961 B1 | | 8/2013 |

* cited by examiner

*Primary Examiner* — Ngoc T Nguyen
(74) *Attorney, Agent, or Firm* — Morgan, Lewis & Bockius LLP (57) ABSTRACT

An intake system for a vehicle may include an intake manifold having an internal space divided into a first chamber and a second chamber by a partition wall, in which intake air flows into the first chamber through a charging path and is then discharged to a portion of an intake port connected to the intake manifold; and intake air flows into the second chamber through a bypass path bypassing charger and is then discharged to another portion of the intake port.

19 Claims, 7 Drawing Sheets

INTAKE SYSTEM FOR VEHICLE

CROSS REFERENCE TO RELATED APPLICATION

The present application claims priority to Korean Patent Application No. 10-2020-0158004, filed Nov. 23, 2020, the entire contents of which is incorporated herein for all purposes by this reference.

BACKGROUND OF THE INVENTION

Field of the Invention

The present invention relates to an automotive intake system that implements a variable tumble system using a separate structure of an intake manifold and that increase tumble flow by preventing a flow loss of intake air flowing into an intake port under a tumble-increasing condition.

Description of Related Art

A variable tumble system has a variable valve mounted at an end portion of an intake manifold and has a tumble plate inserted into the center portion of an intake port formed in a cylinder head, guiding intake air to the upper portion of the intake port under a tumble-increasing condition.

That is, when the variable valve is open, the variable valve is positioned on the bottom portion of the port of the intake manifold, minimizing intake resistance. Accordingly, intake air flows both over and under the plate, so a sufficient amount of intake air is secured.

On the other hand, when the variable valve is closed, the variable valve is rotated such that the end portion of the valve is aligned with the tumble plate. Accordingly, intake air flows only over the tumble plate, so tumble flow may be increased in a combustion chamber.

However, according to existing tumble systems, the width-directional length of the tumble plate is smaller than the width-directional length of an intake port due to the characteristics of the material of the intake port and the production difference between the intake port and the tumble plate. Accordingly, a gap is generated between both sides of the tumble plate and the internal side of the intake port, so a portion of intake air flowing at an upper portion flows at a lower portion, which decreases tumble flow.

Furthermore, a step is generated due to an assembly tolerance of an integrated variable valve and a separate tumble plate, which cause a flow loss of intake air.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automotive intake system that implements a variable tumble system using a separate structure of an intake manifold and that increase tumble flow by preventing a flow loss of intake air flowing into an intake port under a tumble-increasing condition.

To achieve the objectives of the present invention, an intake system for a vehicle includes an intake manifold having a first chamber and a second chamber, in which charged air flows into the first chamber through a charging path and fresh air flows into the second chamber through a bypass path detouring the charging path and is then discharged to another portion of the intake port.

The air in the first chamber may be flowed to a lower portion of the intake port; and the air in the second chamber may be flowed to an upper portion of the intake port.

The partition wall may be formed to laterally cross inside of the intake manifold, so a cross-section of an outlet of the intake manifold may be divided up and downwards.

The first chamber and the second chamber may be formed such that cross-sectional areas are each decreased toward an outlet thereof from an inlet thereof.

A tumble adaptor may be coupled to an outlet of the intake manifold; the tumble adaptor may be inserted into the intake port; and an internal space of the tumble adaptor may be divided up and downwards to be independently connected to the first chamber and the second chamber, respectively.

An intercooler may be connected to a front end portion of the first chamber; a charger may be connected to a front end portion of the intercooler; and an intake pipe may be connected to a front end portion of the charger, whereby a charging path is formed.

A surge tank may be connected between the intercooler and the charger and is directly connected to the intercooler; and the intercooler may be directly connected to an inlet of the first chamber.

A bypass duct may be connected to the second chamber; and a bypass pipe diverging from an intake pipe may be connected to the bypass duct, whereby a bypass path may be formed.

The bypass duct may be directly connected to an inlet of the second chamber.

A bypass valve may be disposed to be able to be opened or closed in the bypass duct, so flow of intake air may be adjusted.

An internal space of the bypass duct may include a first part connected to an inlet of the bypass duct and a second part connected to an outlet of the bypass duct; a plurality of channels may be longitudinally formed between the first part and the second part, so intake air may uniformly flow through the channels.

The first part and the second part may be elongated left and right and may be stacked up and downwards; the inlet of the bypass duct may be formed on a side of the first part; and the outlet of the bypass duct may be formed on the opposite side of the first part.

A blow-by gas flow path may be formed in the intake manifold and gas distribution holes may be formed between the blow-by gas flow path and the second chamber, so that a blow-by gas flowing into the blow-by gas flow path may flow into the second chamber.

The blow-by gas flow path may be longitudinally formed along an external surface of the intake manifold; and the at least a gas distribution hole may be formed for each intake port along the blow-by gas flow path.

The charger may be provided in the charging path; the bypass duct that can adjust a flow rate of intake air may be provided in the bypass path; and the intake system may further include a controller configured for controlling intake air to flow into the intake port only through the first chamber connected to the charging path by closing the bypass duct when the charger is operated.

When the charger is not operated, the controller may be configured to control the intake air to flow into the intake port through the first chamber and the second chamber connected to the charging path and the bypass path, respectively, by opening the bypass duct.

According to various exemplary embodiments of the present invention, when the charger is operated, intake air flows only through the first chamber with the second chamber closed, so that the flow of intake air is concentrated at the lower portion on the intake port. Accordingly, strong tumble is generated in a combustion chamber, which is advantageous in a lean burn operation (lean burn).

Furthermore, when the charger is not operated, the second chamber is opened, so intake air flows not only through the second chamber, but through the first chamber. Accordingly, it is possible to secure a higher flow rate of intake air in a combustion chamber.

Furthermore, a variable tumble system is implemented using the bypass valve without a VCM valve which is applied to existing variable tumble system, so it is possible to reduce the manufacturing cost by removing various portions required to install a VCM valve system and to improve the package around the intake manifold.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a view showing the structure in which blow-by gas flows into the intake manifold of the present invention; and It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described hereafter in detail with reference to the accompanying drawings.

Figure 1:
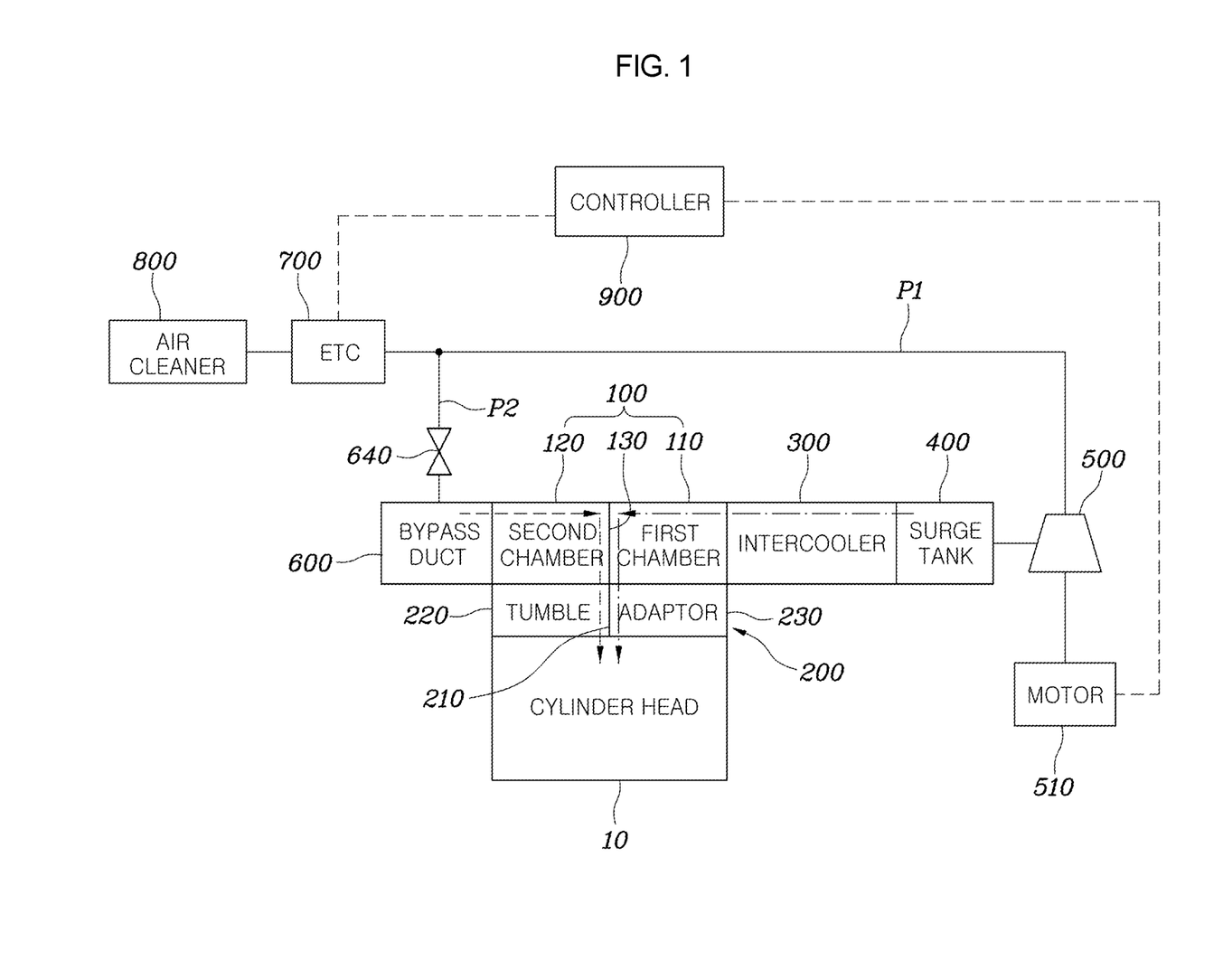
FIG. 1 is a schematic view showing an intake system according to various exemplary embodiments of the present invention.
Figure 2:
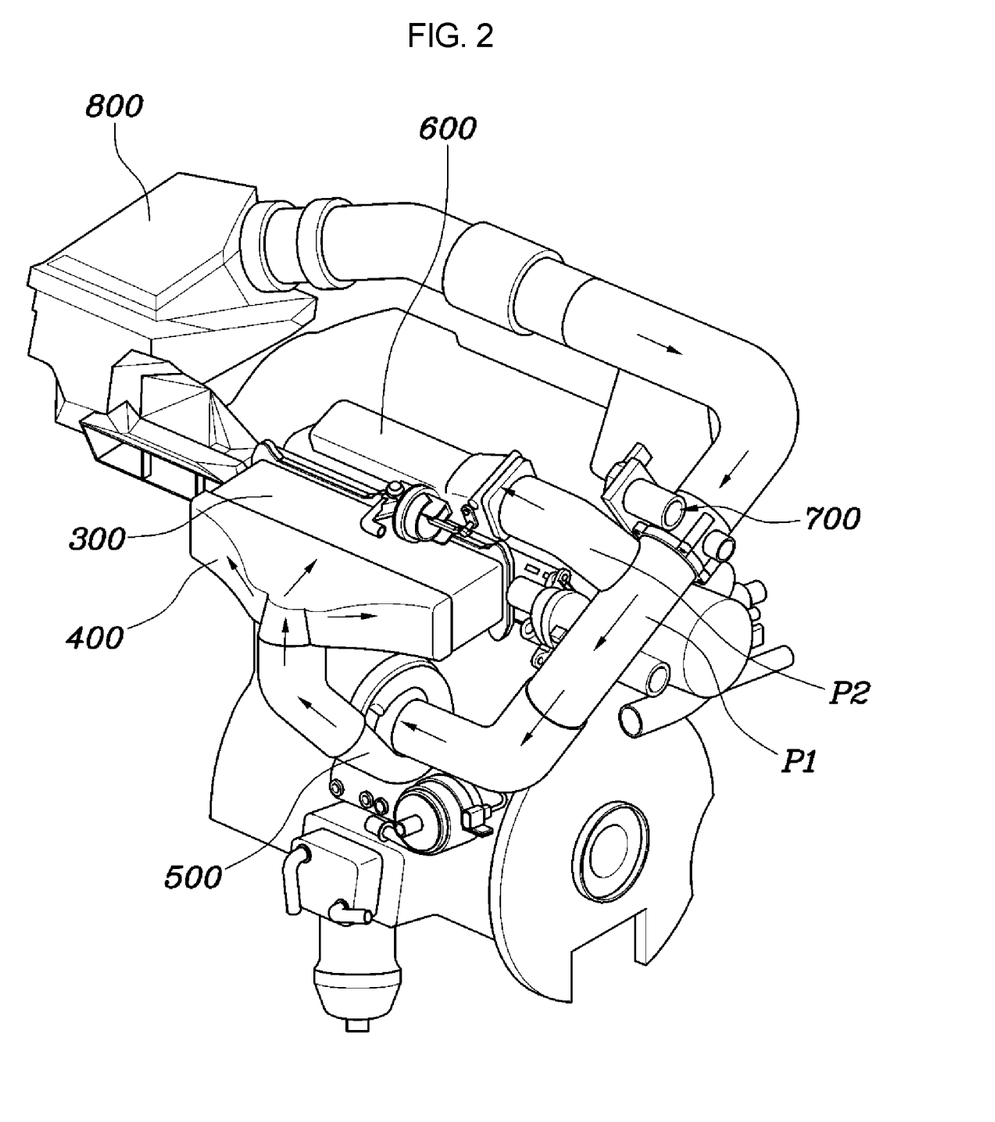
FIG. 2 is a view showing the shape of the intake system shown in FIG. 1.

FIG. 1 is a schematic view showing an intake system according to various exemplary embodiments of the present invention and FIG. 2 is a view showing the shape of the intake system shown in FIG. 1.

Referring to the figures, the present invention includes an intake manifold 100 of which the internal space includes a first chamber 110 and a second chamber 120 by a partition wall 130.

Accordingly, in various aspects of the present invention, intake air flows into the first chamber 110 through a compression path and is discharged to a portion of an intake port 11; and intake air flows into the second chamber 120 through a bypass path detouring the compression path and is discharged to the other portion of the intake port 11.

For example, the partition wall 130 is a plate laterally crossing the center portion of the inside of the intake manifold 100, whereby the first chamber 110 and the second chamber 120 are formed at both sides of the partition wall 130.

Charged air through a charger 500 flows into the first chamber 110 and fresh air bypassing the charger 500 flows into the second chamber 120.

The outlet of the first chamber 110 and the outlet of the second chamber 120 are respectively connected to intake ports 11 formed in cylinder heads 10, so that the intake air discharged from the first chamber 110 and the second chamber 120 is sent to cylinders, respectively.

That is, due to the present separate paths, intake air flows through the first chamber 110 connected to the compression path under a charging condition of the charger 500, so that the intake air flows into a combustion chamber along one side of the intake port 11, being able to increase tumble flow.

On the other hand, in a non-charging condition of the charger 500, intake air flows through the second chamber 120 connected to the bypass path. However, negative pressure is generated in the charger 500 by the pumping operation of pistons in the engine, so intake air flows even though the first chamber 110 connected to the compression path. Accordingly, since intake air flows through the entire intake port 11, it is possible to operate the engine with a maximum flow rate secured.

Figure 3:
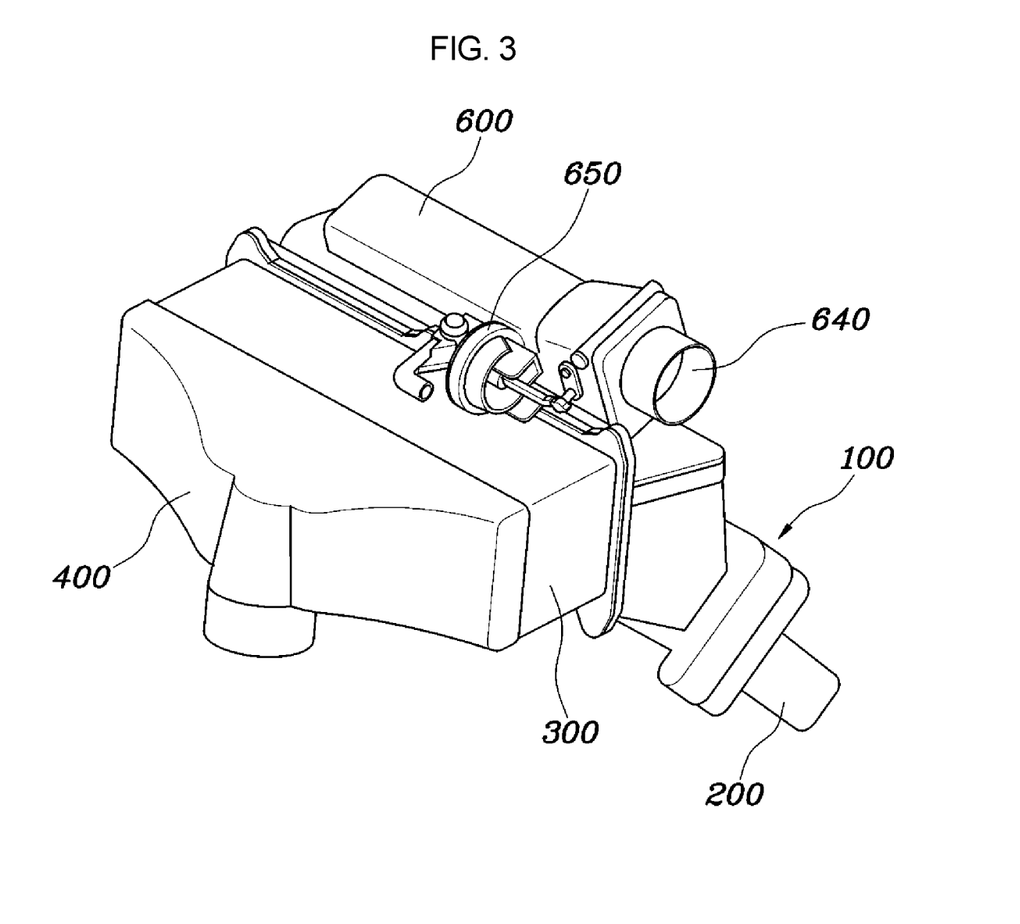
FIG. 3 is a view enlarging an intake manifold according to various exemplary embodiments of the present invention and portions coupled to the intake manifold.
Figure 4:
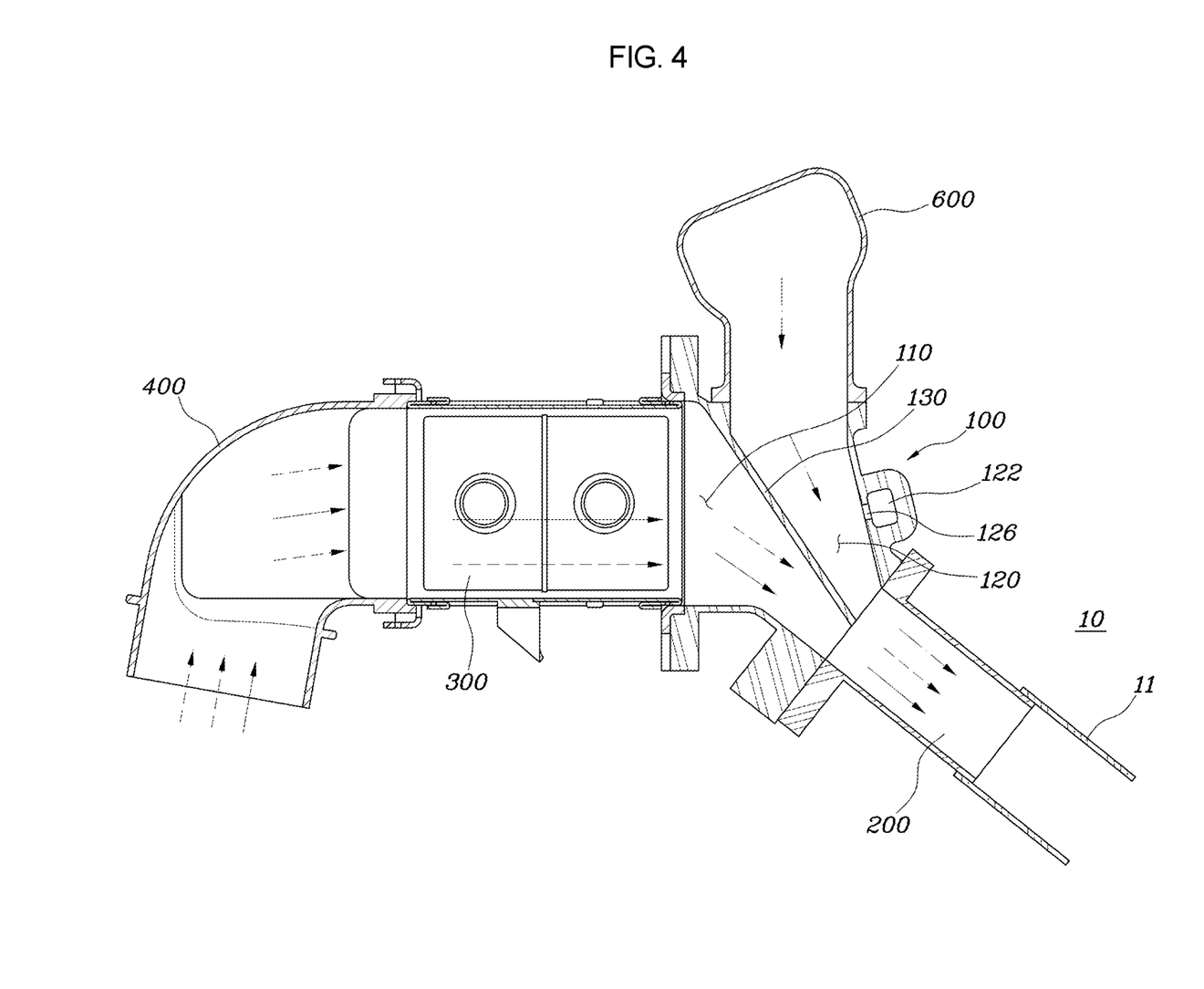
FIG. 4 is a cross-sectional view showing the coupling relationships between the intake manifold according to various exemplary embodiments of the present invention and the parts coupled thereto.

FIG. 3 is a view enlarging the intake manifold 100 according to various exemplary embodiments of the present invention and portions coupled to the intake manifold 100 and FIG. 4 is a cross-sectional view showing the coupling relationships between the intake manifold 100 according to various exemplary embodiments of the present invention and the portions coupled thereto.

Referring to the figures the intake air in the first chamber 110 may be flowed to the lower portion of the intake port 11 and the intake air in the second chamber 120 may be flowed to the upper portion of the intake port 11.

To the present end, the partition wall 130 is formed to laterally cross the inside of the intake manifold 100, so that the cross-section at the outlet of the intake manifold 100 may be divided up and downwards by the partition wall.

That is, it has been known that tumble in a combustion chamber is increased when intake air to be supplied into the combustion chamber is intensively sent to the upper portion of the intake port 11 in the related art.

Therefore, in various aspects of the present invention, charged air flows into the first chamber 110 and is then discharged to the lower portion of the intake port 11, so that the intake air is guided upward at the inlet of the combustion chamber by the fish belly, which increases tumble.

Meanwhile, referring to FIG. 4, the first chamber 110 and the second chamber 120 may be formed such that the cross-sections decrease toward the outlet from the inlet in various exemplary embodiments of the present invention.

That is, the vertical cross-sections of the first chamber 110 and the second chamber 120 have a triangular shape and the inlets of the first chamber 110 and the second chamber 120 face different directions, whereby it is possible to secure sufficient flow cross-sectional areas for intake air in the first chamber 110 and the second chamber 120.

According to various exemplary embodiments of the present invention, the tumble adaptor 200 may be coupled to the outlet of the intake manifold 100; the tumble adaptor 200 may be inserted into the intake port 11; and the internal space of the tumble adaptor 200 may be divided up and downwards to be independently connected to the first chamber 110 and the second chamber 120, respectively.

For example, a flange is formed around the edge portion of the outlet of the intake manifold 100 and a flange is formed around the edge portion of the inlet of the tumble adaptor 200, whereby the inlet of the tumble adaptor 200 is coupled to the outlet of the intake manifold 100.

An adaptor partition wall 210 is laterally formed in a plate shape through the center portion in the tumble adaptor 200, so that the inside of the tumble adaptor 200 includes an upper channel 220 and a lower channel 230 by the adaptor partition wall 210. The adaptor partition wall 210 of the tumble adaptor 200 is aligned with the partition wall 130 of the intake manifold 100.

Accordingly, the intake air discharged from the outlet of the first chamber 110 flows through the lower channel 230 of the tumble adaptor 200 and the intake air discharged from the outlet of the second chamber 120 flows through the upper channel 220, whereby the intake air coming out of the intake manifold 100 is sent into the combustion chamber with the flow maintained at the lower portion of the intake manifold 11.

Referring to FIG. 1, FIG. 2, and FIG. 3, an intercooler 300 is connected to the front end portion of the first chamber 110; a charger 500 is connected to the front end portion of the intercooler 300; and an intake pipe P1 is connected to the front end portion of the charger 500, whereby a charging path may be formed.

For example, the intercooler 300 may be a water-cooling intercooler 300 that cools air charged through the charger 500 and an electric water pump may be further provided to circulate cooling water through the water-cooling intercooler 300.

The charger 500, for example, may be an electric supercharger which is operated by a motor 510, but may be a mechanical super charger or a charger that can charge intake air other than an electric supercharger.

The intake pipe P1 is connected between the charger 500 and an ETC (electronic throttle valve) 700, so air flows into the charger 500. Furthermore, an air cleaner 800 is located upstream the ETC 700, so external air flows inside.

That is, the charging path is a path that allows air is charged and cooled through the electric supercharger and the water-cooling intercooler 400 and then sent to the first chamber 110. Accordingly, in a charging condition, intake air flows to the lower portion of the tumble adaptor 200 through the first chamber 110, whereby strong tumble of the intake air may be achieved.

Figure 5:
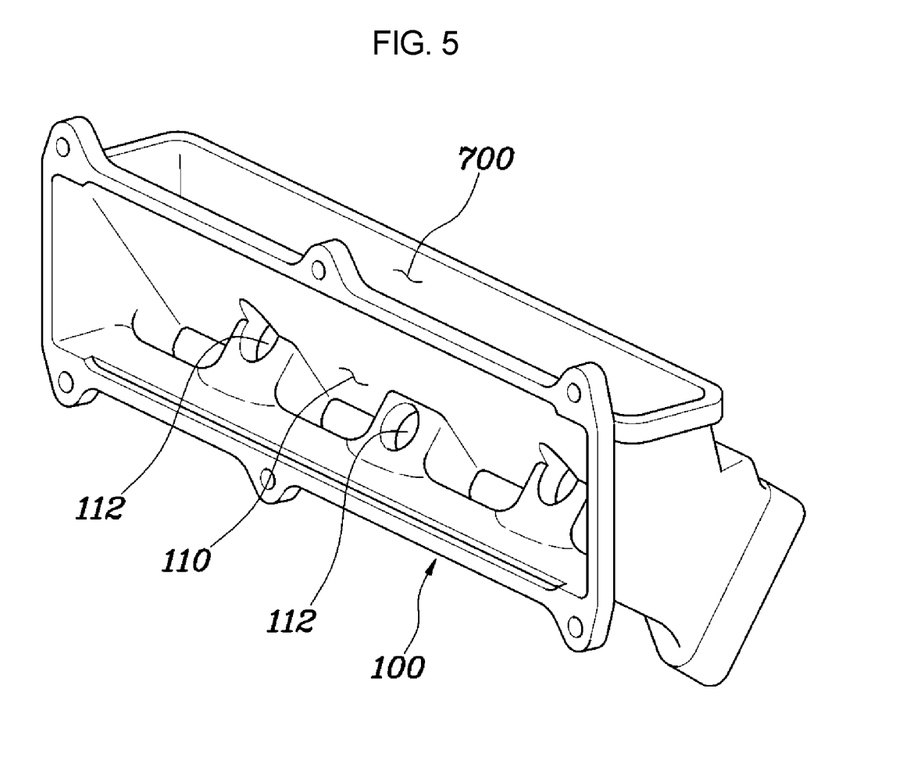
FIG. 5 is a view showing the external shape of the intake manifold of the present invention.

Referring to FIG. 4 and FIG. 5, a surge tank 400 is connected between the intercooler 300 and the charger 500 and is directly connected to the intercooler 300, and the intercooler 300 is directly connected to the inlet of the first chamber 110.

That is, the air charged through the charger 500 flows into the surge tank 400, charged air flows into the intercooler 300 from the surge tank 400, and air cooled through the intercooler 300 flows into the first chamber 110.

To the present end, a flange is formed around the edge portion of the inlet of the first chamber 110, a flange is formed around the edge portion of the outlet of the intercooler 300, and the flanges are bolted, whereby the air cooled through the intercooler 300 can immediately flow into the first chamber 110.

For reference, as shown in FIG. 5, mounting holes 112 are formed at three positions in the first chamber 110 in the longitudinal direction thereof, whereby the intake manifold 100 may be mounted first on an engine and then the intercooler 300 may be mounted on the intake manifold 100.

Meanwhile, referring to FIG. 2, FIG. 3 and FIG. 4, a bypass duct 600 is connected to the second chamber 120; and a bypass pipe P2 diverging from the intake pipe P1 is connected to the bypass duct 600, whereby a bypass path may be formed.

For example, a first end portion of the bypass pipe P2 is connected to the middle portion of the intake pipe P1 connected to the rear end portion of the ETC 700 and a second end portion of the bypass pipe P2 is connected to the bypass duct 600, so external air flows into the bypass duct 600.

That is, the bypass path is a path that enables new air flows into the second chamber 120 while detouring the charger 500 and the intercooler 300 under the condition that charging is not performed by the charger 500. Accordingly, new air flows to the upper portion of the tumble adaptor 200 through the second chamber 120 under a non-charging condition.

However, although the electric supercharger is not operated in the instant case, but the pumping operation of a piston generates negative pressure in the charging unit, so new air also flows into the first chamber 110 through the charging path, so intake air flows not only through the upper portion, but through the lower portion of the tumble adaptor 200. Accordingly, the flow rate of intake air may be increased.

In various exemplary embodiments of the present invention, the bypass duct 600 may be directly connected to the inlet of the second chamber 120.

For example, a thermal bonding surface is formed around the edge portion of the inlet of the second chamber 120 and a thermal bonding surface is formed around the edge portion of the outlet of the bypass duct 600, so that the second chamber 120 and the bypass duct 600 are fixed by thermally bonding the thermal bonding surface to each other.

Referring to FIG. 3, a bypass valve 640 is disposed to be able to be opened or closed in the bypass duct 600, so that the flow of intake air is adjusted.

For example, the bypass valve 640 is disposed at the inlet of the bypass duct 600 to open or close the bypass duct 600.

A bypass actuator (ACT) 650 is connected to the bypass valve 640 and provides an operation force to the bypass valve 640.

Figure 7:
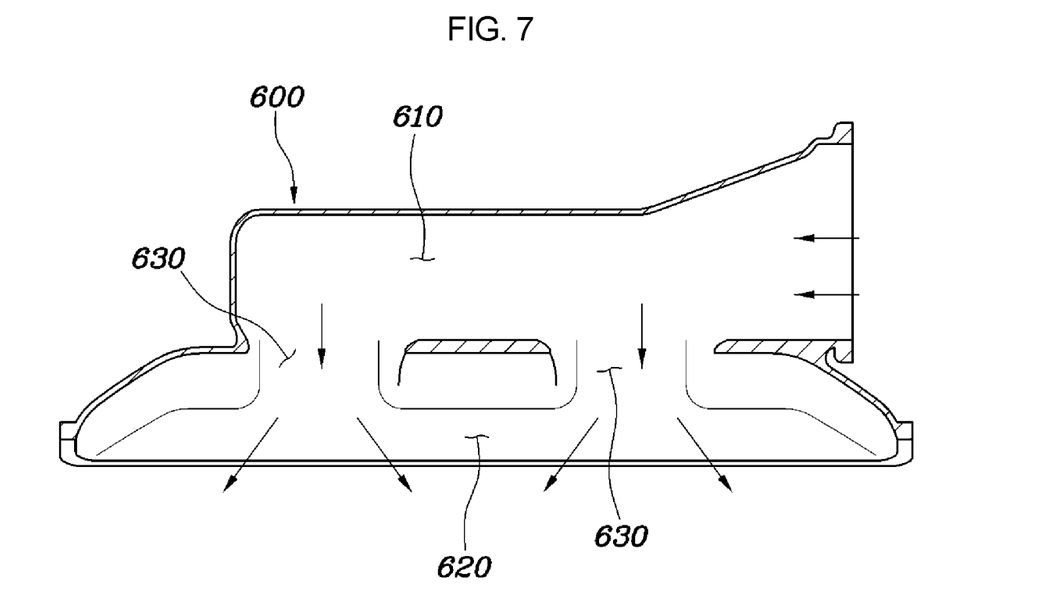

FIG. 7 is a view showing the flow of intake air in the bypass duct 600 of the present invention.

Referring to the figure, the internal space of the bypass duct 600 includes a first part 610 connected to the inlet of the bypass duct 600 and a second part 620 connected to the outlet of the bypass duct 600. A plurality of channels 630 is longitudinally formed between the first part 610 and the second part 620, so intake air can uniformly flow through the channels 630.

The first part 610 and the second part 620 are elongated left and right and are stacked up and downwards; the inlet of the bypass duct 600 may be formed on a side of the first part 610; and the outlet of the bypass duct 600 may be formed on the opposite side of the first part 610.

For example, an inlet member is fixed to the inlet of the bypass duct 600 and connected to the bypass pipe P2. Accordingly, new air flowing inside through the bypass pipe P2 flows into the bypass duct 600 through the inlet member. The new air flowing into the bypass duct 600 is uniformly distributed into the second chamber 120 through the channels 630 formed between the first part 610 and the second part 620.

That is, if the channels 630 between the first part 610 and the second part 620 are not separated and integrated into one channel, the flow of intake air may be concentrated on one side thereof.

Accordingly, two channels 630 are formed between the lower portion of the first part 610 and the upper portion of the second part 620 in various exemplary embodiments of the present invention, so that the intake air flowing into the first part 610 may be uniformly distributed into the second part 620 through the channels 630. Furthermore, the intake air distributed in the second part 620 is uniformly distributed into the second chamber 120. Accordingly, intake air may be uniformly distributed into every cylinder.

Figure 6:
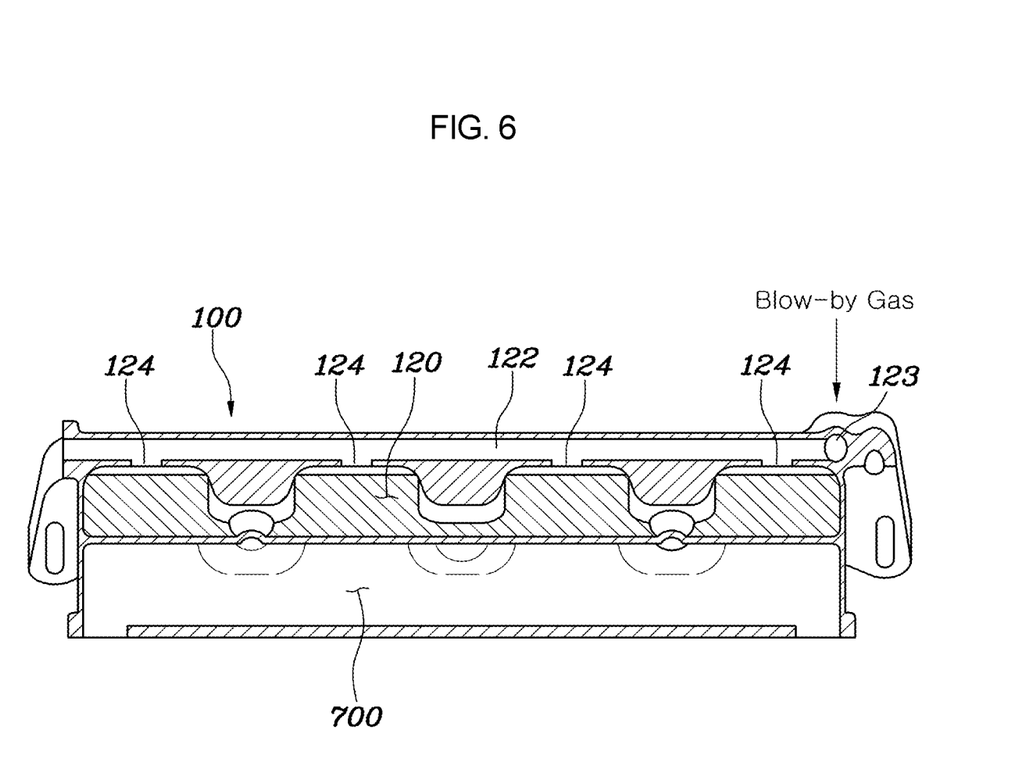
FIG. 6 is a view showing the flow of intake air in a bypass duct of the present invention.

FIG. 6 is a view showing the structure in which blow-by gas flows into the intake manifold 100 of the present invention.

Referring to the figure, a blow-by gas flow path 122 is formed in the intake manifold 100 and gas distribution holes 124 are formed between the blow-by gas flow path 122 and the second chamber 120, so that a blow-by gas flowing into the blow-by gas flow path 122 may flow into the second chamber 120.

In detail, the blow-by gas flow path 122 is longitudinally formed along the external surface of the intake manifold 100 forming the second chamber 120; and the at least a gas distribution hole 124 may be formed for each intake port 11 along the blow-by gas flow path 122.

That is, a blow-by gas inlet 123 is formed at an end portion of the blow-by gas flow path 122 through the intake manifold 100, whereby blow-by gas flows into the blow-by gas flow path 122 through the blow-by gas inlet 123.

Accordingly, the blow-by gas flowing through the blow-by gas flow path 122 flows into the second chamber 120 through the gas distribution holes 126 formed for cylinders, respectively, so that the blow-by gas can uniformly flow into the cylinders.

Referring to FIG. 1, in various exemplary embodiments of the present invention, the charger 500 is provided in the charging path; and the bypass duct 600 that can adjust the flow rate of intake air is provided in the bypass path.

The present invention further includes a controller 900 that controls intake air to flow into the intake port 11 only through the first chamber 110 connected to the charging path by closing the bypass duct 600 when the charger 500 is operated.

That is, under the charging condition by the operation of the electric supercharger, the controller 900 closes the bypass duct 600, so intake air flow only through the charging path without flowing through the bypass path. Accordingly, the air charged through the supercharger is cooled through the intercooler 300 and then flows into the first intake chamber 110. Accordingly, intake air flows to the lower space in the tumble adaptor 200, which can generate strong tumble in a combustion chamber.

When the charger 500 is not operated, the controller 900 can control the intake air to flow into the intake port 11 through the first chamber 110 and the second chamber 120 connected to the charging path and the bypass path, respectively, by opening the bypass duct 600.

That is, under a bypass condition by non-operation of the electric supercharger, the controller 900 opens the bypass duct 600, whereby intake air flows through the bypass path, and accordingly, the air flowing inside through the bypass duct 600 flows into the second chamber 120.

Furthermore, intake air also flows through the charging path, so intake air also flows into the first chamber 110.

Accordingly, intake air can flow into a combustion chamber while flowing through both the upper space and the lower space in the tumble adaptor 200.

For reference, the controller 900 according to exemplary embodiments of the present invention may be implemented through a nonvolatile memory configured to store algorithms for controlling operation of various components of a vehicle or data about software commands for executing the algorithms, and a processor configured to perform operation to be described below using the data stored in the memory. The memory and the processor may be individual chips. Alternatively, the memory and the processor may be integrated in a single chip. The processor may be implemented as one or more processors.

As described above, according to various exemplary embodiments of the present invention, since the intake manifold 100 has a separate type structure having the first chamber 110 and the second chamber 120, a variable tumble system that separately implements a high-tumble operation condition and a high-flow rate operation condition is achieved.

That is, the high-tumble operation is an operation period in which intake air flows into a combustion chamber only through the lower portion of the intake port 11. For example, under the charging condition, intake air flows only through the first chamber 110 with the second chamber 120 closed, so that the flow of intake air is concentrated at the lower portion on the intake port 11. Accordingly, strong tumble is generated in a combustion chamber, which is advantageous in lean burn operation (lean burn).

The high-flow rate operation is an operation period in which intake air flows also through the lower portion of the intake port 11 in addition to the upper portion of the intake port 11. For example, under the non-charging condition, the second chamber 120 is opened, so intake air flows not only through the second chamber 120, but through the first chamber 110. Accordingly, it is possible to secure a higher flow rate of intake air in a combustion chamber.

Furthermore, a variable tumble system is implemented using the bypass valve 640 without a VCM valve which is applied to existing variable tumble system, so it is possible to reduce the manufacturing cost by removing various portions required to install a VCM valve system and to improve the package around the intake manifold 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An intake system for a vehicle, the intake system comprising: an intake manifold having a first chamber and a second chamber, wherein charged air flows into the first chamber through a charging path and fresh air flows into the second chamber through a bypass path and is then discharged to an intake port.

2. The intake system of claim 1, wherein the charged air in the first chamber is flowed to a lower portion of the intake port; and wherein the fresh air in the second chamber is flowed to an upper portion of the intake port.

3. The intake system of claim 1, wherein an partition wall is formed to laterally cross an inside of the intake manifold, so that a cross-section of an outlet of the intake manifold is divided upward and downwards by the partition wall.

4. The intake system of claim 1, wherein the first chamber and the second chamber are formed so that cross-sectional areas thereof are each decreased toward an outlet thereof from an inlet thereof.

5. The intake system of claim 1, further including a tumble adaptor, wherein a first end of the tumble adaptor is coupled to an outlet of the intake manifold, wherein a second end of the tumble adaptor is inserted into the intake port, and wherein an internal space of the tumble adaptor is divided upward and downwards to be independently connected to the first chamber and the second chamber, respectively.

6. The intake system of claim 5, wherein an adaptor partition wall is laterally formed through an interior portion of the tumble adaptor, so that the tumble adaptor includes an upper channel and a lower channel, wherein the upper channel is connected to the second chamber and the lower channel is connected to the first chamber, and wherein the charged air discharged from an outlet of the first chamber flows through the lower channel of the tumble adaptor and the fresh air discharged from an outlet of the second chamber flows through the upper channel.

7. The intake system of claim 1,
wherein an intercooler is connected to a front end portion of the first chamber,
wherein a charger is connected to a front end portion of the intercooler, and
wherein an intake pipe is connected to a front end portion of the charger, for forming the charging path.

8. The intake system of claim 7,
wherein a surge tank is connected between the intercooler and the charger and is directly connected to the intercooler; and
wherein the intercooler is directly connected to an inlet of the first chamber.

9. The intake system of claim 1,
wherein a bypass duct is connected to the second chamber; and
wherein a bypass pipe diverging from an intake pipe connected to the first chamber is connected to the bypass duct, for forming the bypass path.

10. The intake system of claim 9,
wherein an intercooler is connected to a front end portion of the first chamber,
wherein a charger is connected to a front end portion of the intercooler, and
wherein the intake pipe is connected to a front end portion of the charger connected to the intercooler and the intake pipe, for forming the charging path.

11. The intake system of claim 10, wherein the bypass duct is directly connected to an inlet of the second chamber.

12. The intake system of claim 11, wherein a bypass valve is disposed to be opened or closed in the bypass duct, so that flow of intake air into the bypass duct is adjusted.

13. The intake system of claim 10,
wherein an internal space of the bypass duct includes a first part connected to an inlet of the bypass duct and a second part connected to an outlet of the bypass duct, and
wherein a plurality of channels is longitudinally formed between the first part and the second part in the bypass duct, so that intake air uniformly flows through the plurality of channels.

14. The intake system of claim 13,
wherein the first part and the second part are elongated left and right and are stacked up and downwards of the bypass duct,
wherein an inlet of the bypass duct is formed on a first side of the first part, and
wherein an outlet of the bypass duct is formed on a second side thereof, opposite to the first side of the first part.

15. The intake system of claim 1, wherein a blow-by gas flow path is formed in the intake manifold and at least a gas distribution hole is formed between the blow-by gas flow path and the second chamber, so that a blow-by gas flowing into the blow-by gas flow path flows into the second chamber through the at least a gas distribution hole.

16. The intake system of claim 15,
wherein the blow-by gas flow path is longitudinally formed along an external surface of the intake manifold, and
wherein the at least a gas distribution hole is formed for each intake port along the blow-by gas flow path.

17. The intake system of claim 1,
wherein a charger is provided in the charging path,
wherein a bypass duct that is configured to adjust a flow rate of the intake air is provided in the bypass path, and
wherein the intake system further includes a controller configured for controlling the intake air to flow into the intake port only through the first chamber connected to the charging path by closing the bypass duct upon determining that the charger is operated.

18. The intake system of claim 17, wherein upon determining that the charger is not operated, the controller is configured to control the intake air to flow into the intake port through the first chamber and the second chamber connected to the charging path and the bypass path, respectively, by opening the bypass duct.

19. The intake system of claim 17, further including:
- a bypass valve mounted in the bypass duct and electrically connected to the controller to adjust the intake air flowing into the bypass duct; and
- an electronic throttle valve electrically connected to the controller and mounted an end of an intake pipe connected to the charger and forming the charging path,
- wherein a first end portion of a bypass pipe is connected to a portion of the intake pipe connected to a rear end portion of the electronic throttle valve and a second end portion of the bypass pipe is connected to the bypass duct, so that external air selectively flows into the bypass duct when the controller controls the electronic throttle valve.

\* \* \* \* \*